United States Patent [19] [11] 3,954,430
Curtis et al. [45] May 4, 1976

[54] LIQUEFACTION OF CHLORINE BY MULTI-STAGE COMPRESSION AND COOLING

[75] Inventors: Daniel L. Curtis, New Martinsville, W. Va.; John D. Earls, Bellaire, Ohio; Joseph E. Fraker, Jr., New Martinsville, W. Va.

[73] Assignee: PPG Industries, Inc., Pittsburgh, Pa.

[22] Filed: Oct. 30, 1974

[21] Appl. No.: 519,163

[52] U.S. Cl. .................................. 62/23; 62/510; 62/26; 62/40; 62/198
[51] Int. Cl.² .......................................... F25J 3/06
[58] Field of Search .............. 62/23, 9, 11, 41, 115, 62/119, 21, 35, 40, 26, 30, 510; 423/240, 241

[56] References Cited
UNITED STATES PATENTS

| | | | |
|---|---|---|---|
| 1,913,628 | 6/1933 | Falkenberg | 62/9 |
| 2,211,547 | 8/1940 | Reichart | 62/9 |
| 2,754,666 | 7/1956 | Spitzer | 62/23 |
| 3,230,724 | 1/1966 | Havas | 62/21 |
| 3,237,417 | 3/1966 | Honigh | 62/23 |
| 3,374,637 | 3/1968 | Wenzke | 62/23 |

*Primary Examiner*—Norman Yudkoff
*Assistant Examiner*—Frank Sever
*Attorney, Agent, or Firm*—Richard M. Goldman

[57] ABSTRACT

Disclosed are a method and apparatus for liquefying chlorine out of a gas mixture containing chlorine gas and noncondensable gases. According to the disclosed method, a multi-stage compression means is utilized for the gas mixture. The gas is compressed as it passes through the compressor series, and then it passes from the last compressor of the series to a condenser. Liquid chlorine and a second gas mixture, containing larger amounts of non-condensables, are recovered from the condenser. A bleed stream of the liquid chlorine is utilized as a refrigerant for the second gas mixture and is passed through a series of individual economizers co-current to the second gas mixture. The flow of the chlorine refrigerant and of the second gas mixture in the economizers may be countercurrent or co-current to the flow of chlorine gas in the compressors. Chlorine is condensed out of the second gas mixture and the liquid chlorine refrigerant is thereby vaporized and passed to the inlet of an individual compressor in parallel with the economizer.

8 Claims, 4 Drawing Figures

CHLORINE CELL GAS
NONCONDENSED GAS
CONDENSATE
FLASHED CHLORINE

=== CHLORINE CELL GAS
——— NONCONDENSED GAS
====== CONDENSATE
— — — FLASHED CHLORINE

LIQUEFACTION OF CHLORINE BY MULTI-STAGE COMPRESSION AND COOLING

BACKGROUND

In the operation of a typical chlor-alkali plant, the chlorine gas recovered from the electrolytic cells is dried to remove the water vapor carried out with the chlorine gas. The dried cell gas typically contains from about 1 to about 3 weight percent of noncondensables and most frequently from about 1.2 to about 1.5 weight percent of noncondensables. These noncondensables include hydrogen, oxygen, carbon dioxide, and nitrogen. Generally, the noncondensables include from about 0.2 to about 0.3 weight percent hydrogen, from about 50 to about 70 weight percent oxygen, from about 0 to about 20 weight percent carbon dioxide, and from about 20 to about 30 weight percent nitrogen. The chlorine gas generally received from the dryers is at a temperature of from about 10° to 40° Centigrade and at a pressure of from about 0.5 atmosphere to about 5.0 atmosphere.

Generally, in a high pressure system, chlorine is compressed in a multi-stage centrifugal compressor with interstage cooling, for example, with cooling tower water or any other suitable coolant, between every one or two or three or four or more stages. Thus, in a typical modern plant the dried chlorine-containing gas is delivered to the chlorine compressor at a temperature of about 29° Centigrade and at a pressure of about one atmosphere. After the first two stages of compression, the temperature is about 115° Centigrade and the pressure is about 1.5 atmospheres and the compressed gas is cooled. After the fourth stage of compression, the temperature is about 121° Centigrade, the pressure is about 3.1 to 3.2 atmospheres, and the compressed chlorine gas is cooled, for example, by cooling tower water or other suitable coolants, to a temperature of about 35° to 40° Centigrade. It can then be subjected to further stages of compression, for example, to two additional stages, yielding a pressure of about 6.0 to about 6.1 atmospheres and a compressor outlet temperature of about 121° Centigrade. An additional intercooler may be provided, lowering the temperature to about 35° to about 40° Centigrade, permitting further compression to a pressure of about 12.5 to 12.7 atmospheres and recovering therefrom a pressurized gas mixture at a temperature of about 115° Centigrade. The compressed chlorine gas mixture obtained thereby may be readily liquefied, for example, by passing through a condenser to obtain a cooling of the chlorine to about 35° Centigrade or lower thereby liquefying a significant fraction of the chlorine.

After liquefaction of the chlorine, a second gas mixture is present in the condenser and recovered therefrom. This second gas typically contains, depending on the pressure and temperature of condensation of the chlorine, from about 5 to about 20 percent noncondensables and most frequently from about 8 to about 15 percent noncondensables. Noncondensables are typically hydrogen, oxygen, carbon dioxide, nitrogen, and traces of other gases. According to the more common practice in the prior art, the chlorine is typically condensed out of the second gaseous mixture by cooling the second gaseous mixture with refrigerants such as fluorinated hydrocarbons. However, it is also known to condense the chlorine out of the second gas mixture by using the condensed chlorine to cool and liquefy the chlorine in the second gas mixture and then use the newly vaporized chlorine coolant as the feed to the first stage of the compressor. See, for example, United Kingdom patent 353,704 to Krebs & Company and United Kingdom patent 1,164,069 to Shipton. Similarly, it is also known to both utilize a fraction of the liquid chlorine as a coolant and to expand the second gas mixture slightly so as to affect some cooling thereof and some liquefaction thereof. See, for example, U.S. Pat. No. 3,230,724 to Havas.

However, in all of the processes of the prior art utilizing liquid chlorine as a coolant, only a single cooling stage is disclosed and the vaporized coolant is recycled to the first compressor in the compressor train.

SUMMARY

It has now been found that particularly outstanding utilization of chlorine as a coolant and as a refrigerant or as both a coolant and refrigerant may be obtained if an economizer train is utilized having a plurality of economizer units in series, wherein the flow of the liquid chlorine refrigerant and the second gas mixture are co-current with each other and countercurrent or co-current to the flow of feed chlorine being compressed. It has further been found that this process is particularly desirable if the vaporized chlorine refrigerant is promptly withdrawn from the economizer system, for example, after each economizer stage, and returned to the compressor system at an intermediate compressor where some degree of compression has occurred but where the inlet pressure to the compressor is equal to or slightly lower than the equilibrium vapor pressure of the vaporized chlorine refrigerant being fed to the compressor inlet.

DETAILED DESCRIPTION OF THE INVENTION

According to this invention, chlorine is liquefied out of a gas mixture containing gas and noncondensable gases. In the method of this invention, the chlorine gas mixture is fed to the compressor means and the gas compressed within the compressor means. The compressor means contain a plurality of individual compressors in series so that the exhaust or product stream from one compressor is the feed or inlet stream to the next adjacent compressor in the series and is subject to further compression in the next adjacent compressor. According to our invention, the compressed gas is passed to a condenser or condenser train and liquid chlorine and a second gas mixture, reduced in chlorine content, are recovered from the condenser. Typically, the feed to the compressor train contains from about 0.002 to about 0.005 percent hydrogen, from about 0.2 to about 2.0 percent oxygen, from about 0.2 to about 2.0 percent nitrogen, and from about 0.0 to about 0.30 weight percent carbon dioxide. The second gas mixture, recovered from the condenser, contains from about 0.016 to about 0.05 weight percent hydrogen, from about 1.6 to about 24.0 weight percent nitrogen, from about 0.0 to about 4.8 weight percent carbon dioxide, and from about 1.6 to about 24.0 weight percent oxygen.

A portion of the liquid chlorine recovered from the condenser is passed to one feed stream of an economizer means as the refrigerant therefor. The second gas mixture is passed to a second feed stream of the economizer means. In this way, indirect thermal conduct, i.e., indirect heat transfer contact, is provided between the liquid chlorine, as a refrigerant, and the second gas mixture, thereby serving to condense the chlorine out of the second gas mixture while simultaneously vaporizing a portion of the liquid chlorine refrigerant fed to the economizer. According to our invention, the economizer means contains a plurality of individual economizers in series. In this way, the uncondensed fraction of the second as mixture passes from one economizer in the series to the next economizer in the series and the condensed fraction of the second gas mixture is recovered from the economizer means between the individual economizers.

The flow of both liquid chlorine refrigerant and the second gas mixture through the economizer means are parallel to each other, and both are either countercurrent or co-current to the flow of compressed gas through the parallel compressor train. From a mechanical layout viewpoint, countercurrent flow is preferred.

The liquid chlorine refrigerant passes through the economizers in series and is vaporized within the individual economizers at different pressures along the series of economizers. The liquid chlorine refrigerant enters the first economizer at a relatively high pressure, corresponding roughly to the pressure in the condenser and exits from the last economizer in the economizer train at a pressure lower than the pressure of chlorine in the condenser and equal to or slightly greater than the inlet pressure of the compression stage to which it is connected. The chlorine refrigerant temperature is controlled by the back pressure of the compression stage to which it is connected. This maintains the chlorine refrigerant in each economizer at a lower temperature than the second gas mixture in the economizer, so as to provide a heat transfer driving force from the second gas mixture to the liquid chlorine refrigerant, thereby vaporizing the liquid chlorine refrigerant and simultaneously condensing chlorine from the second gas mixture.

The vaporized chlorine refrigerant is passed from the economizer to the inlet of an individual compressor within the compressor train. The individual compressor has a lower chlorine inlet pressure than the vapor pressure of the chlorine refrigerant in the individual economizer, as will be more fully explained hereinafter.

Our invention may be understood by reference to the figures.

According to this invention, chlorine is liquefied from a first gas mixture containing chlorine and noncondensables. The first gas mixture yields liquid chlorine and a second gas mixture richer in noncondensables, i.e., having a higher mole fraction of noncondensables than the first or fed gas mixture. A stream of the chlorine condensate is used as a refrigerant to cool the second gas mixture, condensing chlorine therefrom. The cooling is accomplished by successively vaporizing portions of the condensate in an economizer train, and feeding the vaporized chlorine to an intermediate compressor of the compressor means.

Figure 1:
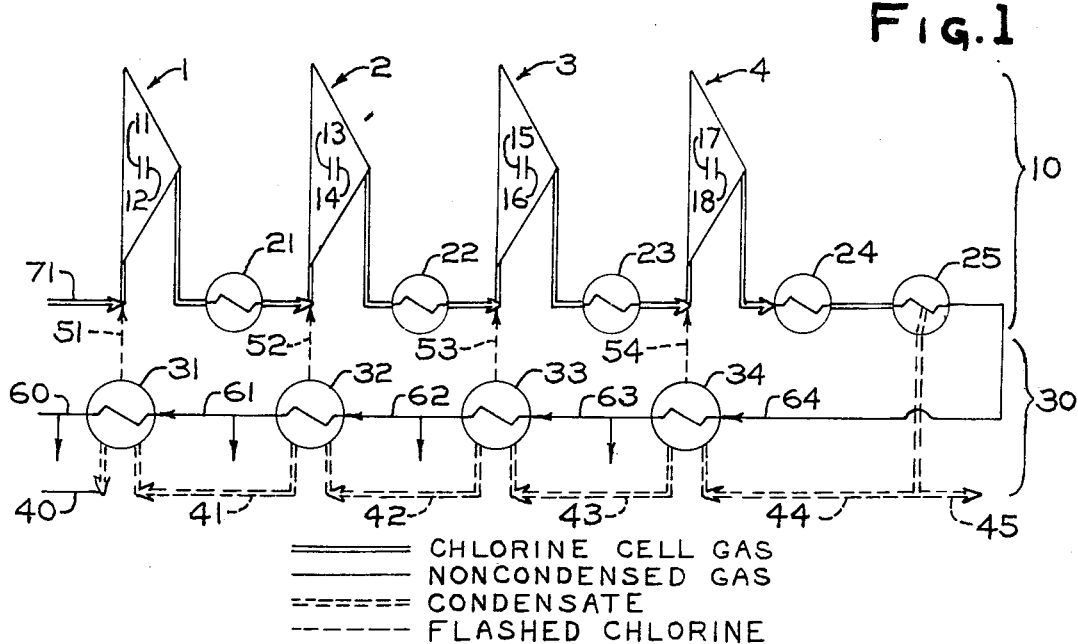
FIG. 1 is a generalized flow chart of the chlorine streams through the compressors and economizers of the chlorine compression-liquefaction system.
Figure 3:
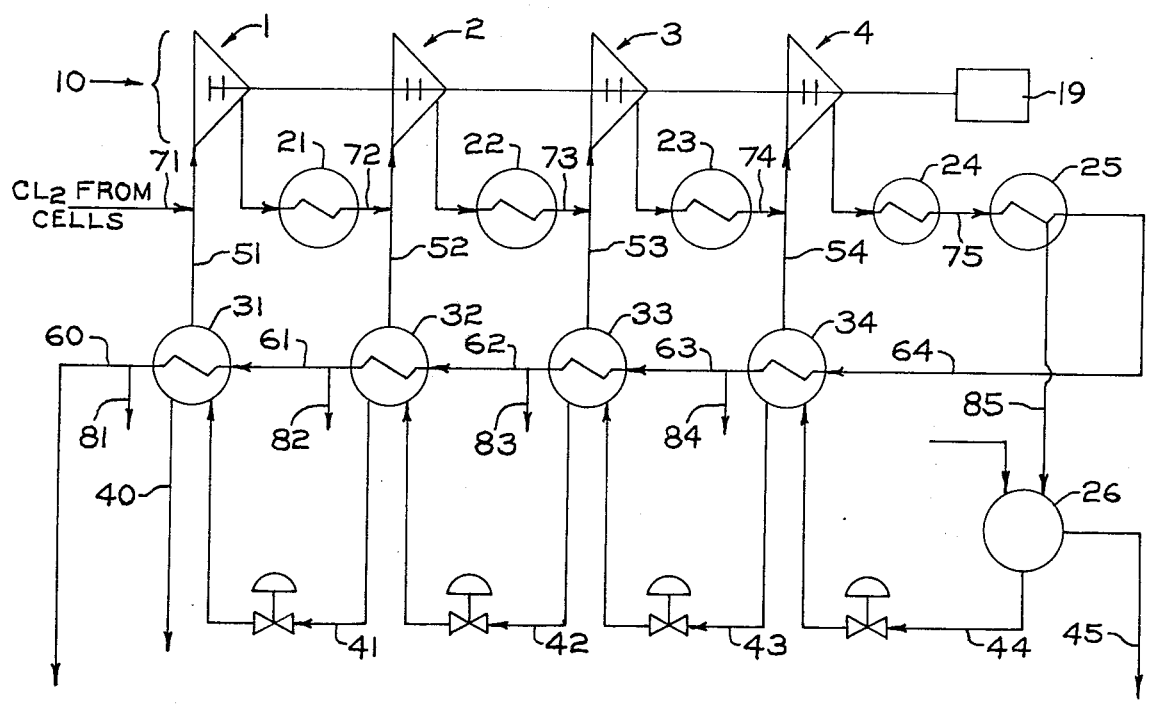
FIG. 3 is a generalized flow chart of a complete liquefaction plant.
Figure 4:
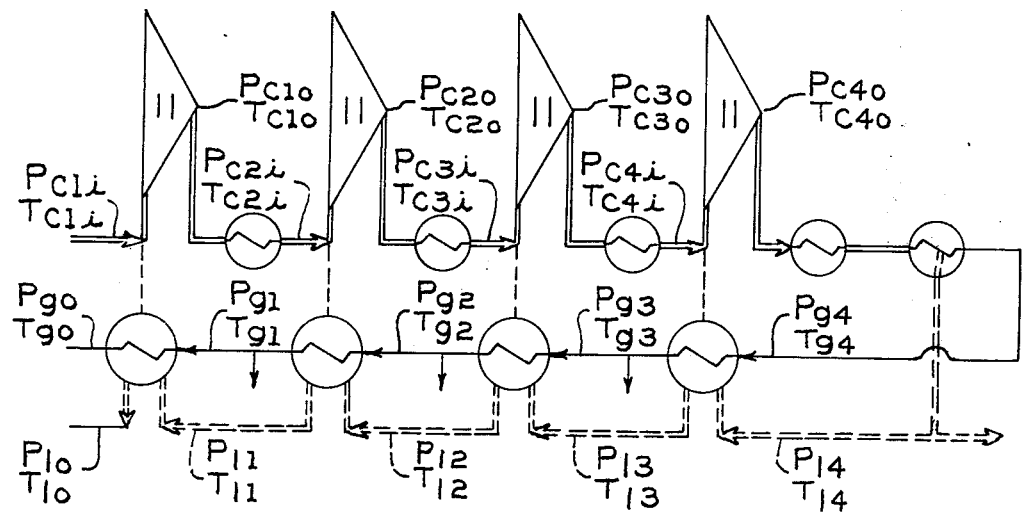
FIG. 4 shows the system of FIG. 1 with the temperature and pressure indication.

According to the method of our invention, the first gas mixture (71) is fed to a compressor means (10) and compressed within the compressor means (10) comprising a plurality of individual compressors (11 through 18) in series. This may be understood by reference to FIGS. 1, 3, and 4. As shown in the figures, especially FIG. 3, the chlorine enters the compressor means (10) through feed line (71). As shown in the figures, each compressor housing (1, 2, 3, 4) contains two compressor stages (11, 12, 13, 14, 15, 16, 17, 18). The feed to the first stage (1) is at a pressure $P_{C1i}$ and a temperature $T_{C1i}$. The product of the second stage compressor (12) exits the first housing (1) at a pressure of $P_{C1o}$ and a temperature of $T_{C1o}$. The compressed, super heated gas then goes through an intercooler (21) where cooling tower water or other coolants are used to cool the compressed gas. The cooled compressed gas, at a pressure of $P_{C2i}$ and a temperature of $T_{C2i}$ is then fed to a second compressor housing (2) containing the third and fourth compressor stages (13 and 14). The compressed gas exiting from the second housing (2) is at a pressure of $P_{C2o}$ and a temperature of $T_{C2o}$ and is cooled by intercooler (22) to a temperature of $T_{C3i}$ and a pressure of $P_{C3i}$. The cooled compressed gas may then be fed to a third housing (3) containing a fifth and sixth compressor stage (15 and 16). The super heated, compressed chlorine gas exiting the fifth and sixth stages (15 and 16) in the third compressor housing (3), at a temperature of $T_{C3o}$ and a pressure of $P_{C3o}$ is fed to a third intercooler (23) and cooled to a temperature $T_{C4i}$ and a pressure $P_{C4i}$. This compressed gas is then fed to seventh and eighth stages of compression (17 and 18) in a fourth compressor housing (4) where it is compressed to a pressure of $P_{C4o}$ and a temperature of $T_{C4o}$.

In the compressor train series (10) shown in the figures, the product of one compressor is the feed to the next adjacent compressor in the series and the pressure of chlorine in one compression is less than the pressure of chlorine in the next adjacent compressor in the series and greater than the pressure of chlorine in the prior compressor of the compressor train. The work done on the gas in compressing it results in a temperature increase between stages. The heat of compression is removed by intercoolers (21, 22, 23) and after cooler (24).

After the compressed, super heated chlorine gas leaves the last stage (18) of the compressor train (10), it is cooled and condensed, for example, in after cooler (24) and condenser (25). In this way, liquid chlorine and a second gas mixture, containing from about 65 to about 95 weight percent chlorine gas and balance noncondensables, as described hereinabove, is obtained.

According to this invention, the chlorine gas is condensed out of the second gas mixture by vaporizing a portion of the liquid chlorine refrigerant to gaseous chlorine in indirect thermal contact, i.e., indirect heat transfer contact, with the second gas mixture. In this way, heat is transferred from the second gas mixture to the liquid chlorine refrigerant, thereby condensing chlorine out of the second gas mixture while vaporizing liquid chlorine refrigerant. By thermal contact between the liquid chlorine refrigerant and the second gas mixture is meant indirect heat exchange contact such as in a shell and tube heat exchanger, for example, as shown in FIG. 2.

Figure 2:
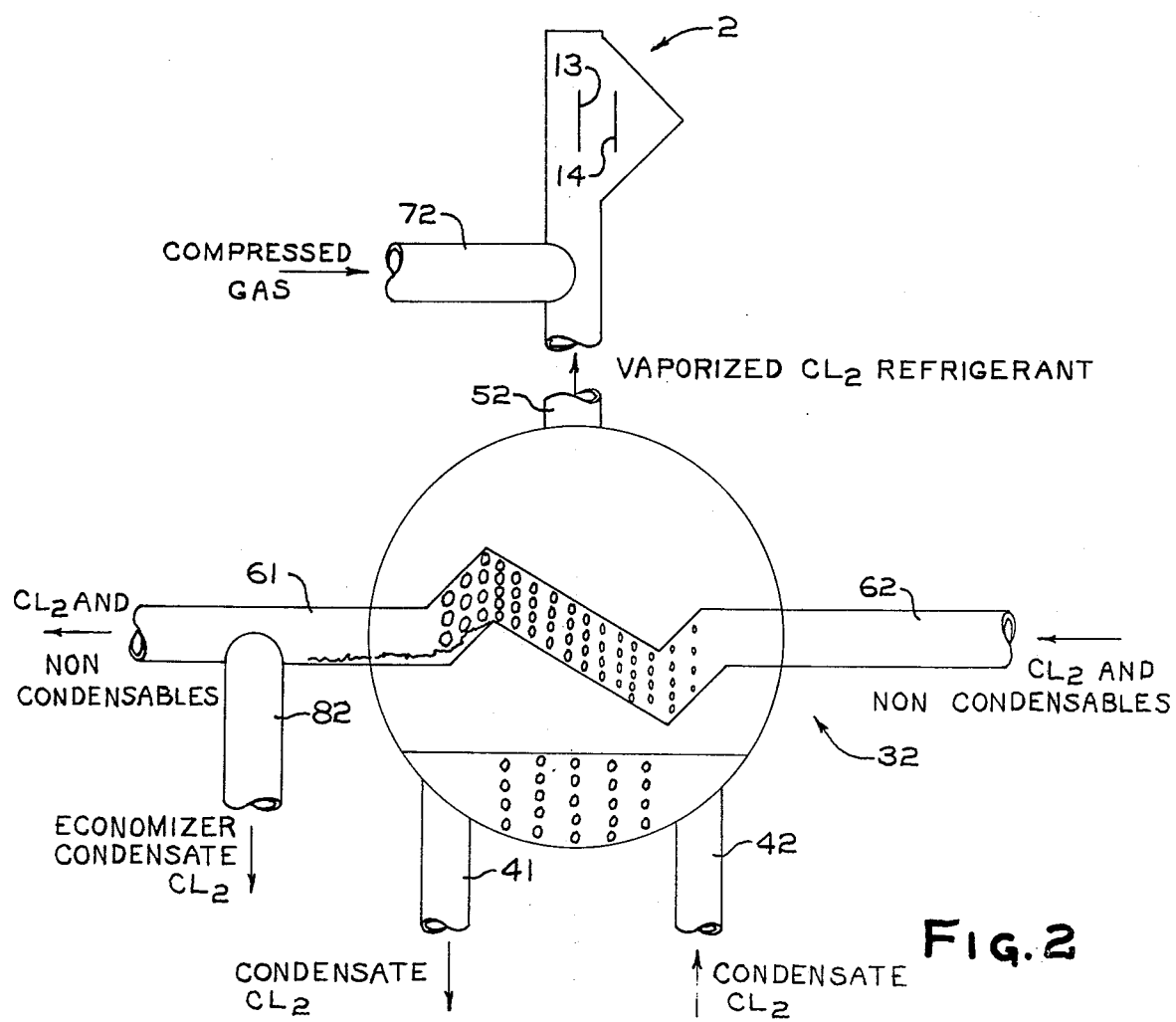
FIG. 2 is a detailed schematic of an intermediate economizer and intermediate compressor within the respective economizer and compressor trains of the chlorine compression-liquefaction system.

As shown in FIG. 2, the second gas mixture containing chlorine and noncondensables enters individual economizer (32) through tube side inlet (62) and exits through the tube side outlet (61), while liquid chlorine refrigerant enters the economizer (32) through shell side inlet (42) and exits through shell side outlet (41), and the vaporized chlorine refrigerant exits from the chlorine economizer (32) through shell side outlet (52).

The liquid chlorine refrigerant is at a temperature of from about 0.5 degrees to about 20 degrees Centigrade less than the second gas mixture in the individual economizer (32). In this way, heat transfer occurs from the second gas mixture to the liquid chlorine refrigerant thereby condensing a portion of the chlorine in the second gas mixture while flashing a portion of the liquid chlorine refrigerant. The vaporized liquid chlorine refrigerant is withdrawn from the economizer (32) through outlet (52) and fed to an individual intermediate stage of compression (13) in a compressor unit (2).

The method of this invention consists of passing liquid chlorine from the liquefaction condenser to be used as refrigerant stream of an economizer means (30) and passing the second gas mixture for a second stream to the economizer means (30), for example, as a shell and tube economizer (31, 32, 33, 34), with the second gas mixture on the tube side (61, 62, 63, 64), and the liquid chlorine refrigerant on the shell side (41, 42, 43, 44). Indirect thermal contact is provided between the liquid chlorine refrigerant and a second gas mixture within the economizer, thereby condensing liquid chlorine out of the second gas stream and vaporizing the liquid chlorine fed to the economizer as the refrigerant.

According to this invention, there are a plurality of compressor units (1 through 4) in series in the compressor means (10) so that the feed to one individual compressor unit is the product of the prior compressor unit and the vaporized refrigerant from the economizer in parallel with the compressor unit, such as: economizer (31) and compressor unit (1) with individual compressors (11 and 12), or economizer (32) and compressor unit (2) with individual compressor (13 and 14), or economizer (33) and compressor unit (3) having individual compressors (15 and 16), or economizer (34) and compressor unit (4) with individual compressors (17 and 18), such that the pressure of the vaporized refrigerant is greater than the pressure of the inlet to the individual compressor unit, so that the vaporized chlorine refrigerant from the economizer is fed to the compressor in parallel therewith.

In a preferred mode of this invention, the liquid chlorine refrigerant is fed to a plurality of economizers (34, 33, 32, and 31) in series, countercurrent to the flow of chlorine through the compressor units (1, 2, 3, and 4). In this way, the pressure of the chlorine refrigerant is reduced along the economizer train (30) thereby decreasing the boiling point of the chlorine refrigerant and vaporizing a portion of the liquid chlorine refrigerant at decreasing pressures along the economizer train (30). The chlorine refrigerant so vaporized is fed back to individual, intermediate compressor having an inlet pressure slightly below the pressure of the refrigerant side of the economizer with which it is connected. Thus, as shown in the Figures, the refrigerant side of economizer (34) has a pressure greater than the inlet to compressor (17) of compressor unit (4) to which it is fed, the refrigerant side of economizer (33) has a pressure greater than the inlet to compressor (15) of compressor unit (3) to which it is fed but less than the inlet pressure to unit (4), the refrigerant side of economizer (32) has a pressure greater than the inlet pressure to compressor (13) of compressor unit (2) to which it is fed but less than the inlet pressure to unit (3), and refrigerant side of economizer (31) has a pressure greater than the inlet to compressor (11) of compressor unit (1) to which it is fed but less than the inlet pressure to unit (2). In this way, the vaporized chlorine from economizer (31) is fed to compressor (11) of compressor unit (1), the vaporized chlorine from economizer (32) is fed to compressor (13) of compressor unit (2), the vaporized chlorine from economizer (33) is fed to compressor (15) of compressor unit (3), and the vaporized chlorine from economizer (34) is fed to the inlet of compressor (17) of compressor unit (4). Generally, the pressure of the refrigerant side of the economizer will exceed the inlet pressure to the compressor stage parallel thereto by about 0.02 atmospheres, and generally by less than 0.30 atmospheres.

As used herein, a compressor is said to be in parallel with an economizer if the inlet pressure to that compressor is less than the pressure in the refrigerant side of the economizer in question, but the inlet pressure to the next adjacent compressor in the series is greater than the pressure in the refrigerant side of the economizer in question. Thus, for example, as used herein, economizer (31) is in parallel with compressor (11) of compressor unit (1). Economizer (31) is in parallel with compressor (11) of compressor unit (1) because it has a refrigerant side pressure greater than the inlet pressure of compressor (11) of compressor unit (1) but less than the inlet pressure to compressor (12) of compressor unit (1). Economizer (32) is in parallel with compressor (13) of compressor unit (2) because it has a refrigerant side pressure greater than the inlet pressure to compressor (13) of compressor unit (2) but less than the inlet pressure to compressor (14) of compressor unit (2), and economizer (33) is in parallel with compressor (15) of compressor unit (3) because compressor (33) has a refrigerant side pressure greater than the inlet pressure to compressor (15) of compressor unit (3) but less than the inlet pressure of compressor (16) of compressor unit (3). Thus, according to this invention, the liquid chlorine refrigerant vaporized in an economizer is withdrawn from the economizer and passed to the inlet of the compressor in parallel with the economizer as the term "in parallel" is used herein and defined hereinabove. For example, as shown in the Figures, refrigerant vaporized in economizer (34) may go through line (54) to compressor unit (4) in parallel therewith, refrigerant vaporized in economizer (33) may go through line (53) to unit (3) in parallel therewith, refrigerant vaporized in economizer (32) may go through line (52) to compressor unit (2) in parallel therewith, and refrigerant vaporized in economizer (31) may go through line (51) to compressor unit ( 1 ) in parallel therewith.

The liquid chlorine condensed out of the second gas mixture lines (81, 82, 83, 84) may advantageously be recovered from the second gas mixture between adjacent economizers or anywhere within the economizer train. Alternatively, the chlorine condensed out of the second gas mixture may be carried through the economizer train (30) and all recovered at the end. Or, the chlorine condensed out of the second gas mixture may even be vaporized the presence of the primary liquid chlorine to subcool the primary liquid chlorine.

The final gas product of the economizer line (60) is enriched in noncondensables. It may have more than 50 percent noncondensables therein, i.e., less than 50 weight percent chlorine therein, and preferably greater than 70 weight percent noncondensables therein, i.e., less than 30 weight percent chlorine therein.

The gaseous chlorine obtained by vaporizing the liquid chlorine refrigerant in the individual economizers is thereafter fed to parallel compressors and compressed with the first gas mixture as described above.

In one particularly desirable exemplification of this invention, the feed to compressor unit (1) containing stages (11 and 12) is at a temperature of about 15° Centigrade and a pressure of about 1 atmosphere. The compressed product gas is recovered from the first unit (1), containing the first two stages (11 and 12) at a temperature of about 57° Centigrade and a pressure of about 1.49 atmospheres. This is then cooled by intercooler (21) to a temperature to about 37.8° Centigrade and fed to compressor stages (13 and 14) in unit (2). In Compressor unit (2), compressors (13 and 14), the gas is compressed to about 3.15 atmospheres and heated to 115° Centigrade. The gas is then cooled in intercooler (22) to 37° Centigrade, and fed to compressor (15) in compressor unit (3). The compressed gas recovered from compressor stages (15) and (16) is at a temperature of about 121° Centigrade and a pressure of about 6.12 atmospheres. It is cooled to a temperature of about 37.8° Centigrade in intercooler (23) and fed to compressor stages (17) and (18) in compressor unit (4). The super heated gas recovered from compressor stages (17) and (18) is at a temperature of about 115° Centigrade and a pressure of about 12.5 to 13.0 atmospheres. This is then cooled to about 55° Centigrade in cooler (24) and passed to a condenser (25) where the condensing medium is cooling tower water or other suitable coolant at a temperature of 29° Centigrade. Approximately 85 to 95 weight percent of the chlorine is condensed in the condenser (25) providing liquid chlorine. A second gaseous mixture containing about 85 to 95 weight percent chlorine and balance noncondensables is recovered.

A stream (44) of liquid chlorine is withdrawn from surge drum (26) and used as a refrigerant in the multistage economizer (30).

The gas feed (64) to the first stage of the economizer (34) is at a temperature of about 35° Centigrade and a pressure of about 12.5 atmospheres where it is contacted with a stream (44) of liquid chlorine refrigerant that is at a temperature near the saturation temperature for the inlet pressure to compressor (17) of compressor unit (4). If high vapor pressure impurities are present in the refrigerant, the refrigerant may be at a temperature slightly below the saturation temperature for the inlet pressure to compressor (17) of compressor unit (4). When, however, the refrigerant is essentially pure chlorine, it will be at a temperature slightly above the temperature corresponding to the saturation temperature for the inlet pressure to compressor (17) of compressor unit (4). Approxmately 10 to 80 weight percent of the chlorine in the second gaseous mixture is condensed at this stage. The vaporized chlorine refrigerant is fed through line (54) from economizer (34) to the inlet of compressor unit (4). Meanwhile, the condensed chlorine from the second gaseous stream is recovered through line (84) and the balance of the second gaseous mixture stream (63) is fed to economizer (33).

The liquid chlorine refrigerant (43) is vaporized in economizer (33) from 17.2° Centigrade and 6.2 atmospheres to −3.3° Centigrade and 3.265 atmospheres. This results in cooling the second gaseous stream (63) from 20° Centigrade to −1° Centigrade and condensing an additional 17 to 22 weight percent of the chlorine in the second gaseous stream. The vaporized chlorine refrigerant is then passed through line (53) from economizer (33) at a pressure of 3.265 atmospheres to the inlet of compressor unit (3) while the inlet to the compressor unit (3) is at a pressure of about 3.125 atmospheres, providing a pressure difference of about 0.13 atmospheres.

The liquid chlorine refrigerant (42) to economizer (32) is vaporized from a temperature of −3.33° Centigrade and a pressure of 3.265 atmospheres to a temperature of −23° Centigrade and a pressure of 1.56 atmospheres further cooling the second gas mixture (62). The vaporized chlorine refrigerant is passed through line (52) from economizer (32) to the inlet of compressor unit (2).

The liquid chlorine refrigerant (41) to economizer (31) is vaporized from a temperature of −23° Centigrade and a pressure of 1.56 atmospheres further cooling the small amount of remaining second gas mixture (61). The vaporized chlorine refrigerant is passed through line (51) from economizer (31) to the inlet of compressor unit (1).

The ultimate second gaseous mixture (60) recovered from the final economizer stage (31) of the economizer means (30) contains about 72 weight percent noncondensables, thereby providing ultimate recovery of 97 to 99.9 weight percent of the chlorine in the feed gas (71) as liquid chlorine.

The noncondensables (60) may then be treated to yield stack gases or fed to other processes.

A refrigerant purge may be taken from any one or all of the economizers (31, 32, 33, 34) in economizer means (30) as line (40) from economizer (31).

In another desirable exemplification of this invention, the feed to compressor unit (1) containing stages (11 and 12) is at a temperature of about 26° Centigrade and a pressure of about 1 atmosphere. The compressed product gas is recovered from the first unit (1), containing the first two stages (11 and 12), a pressure of about 2.041 atmospheres, cooled by intercooler (21) to a temperature of about 36.7° Centigrade, and fed to compressor stages (13 and 14) in unit (2). In compressor unit (2), compressors (13 and 14), the gas is compressed to about 3.81 atmospheres, cooled in intercooler (22) to 35.88° Centigrade, and fed to compressor (15) in compressor unit (3). The compressed gas recovered from compressor stages (15 and 16) is at a pressure of about 7.48 atmospheres. It is cooled to a temperature of about 37.6° Centigrade in intercooler (23) and fed to compressor stages (17 and 18) in compressor unit (4). The super heated gas recovered from compressor stages (17 and 18) is at a pressure of about 14.63 atmospheres. It is then cooled to about 35° Centigrade in cooler (24) and passed to a condenser (25) where the condensing medium is cooling tower water or other suitable coolant at a temperature of 29° Centigrade. Approximately 85 to 95 weight percent of the chlorine is condensed in the condenser (25) providing liquid chlorine. A second gaseous mixture containing about 85 to 95 weight percent chlorine and balance noncondensables is recovered.

A stream (44) of liquid chlorine is withdrawn from surge drum (26) and used as a refrigerant in the multistage economizer (30).

The gas feed (64) to the first stage of the economizer (34) is at a temperature of about 35° Centigrade and a pressure of about 14.28 atmospheres where it is indirectly contacted with a stream (44) of liquid chlorine refrigerant that is at a temperature near the saturation temperature for the inlet pressure to compressor (17) of compressor unit (4). This may be a temperature of about 24.4° Centigrade, corresponding to a compressor inlet pressure of 7.48 atmospheres. If high vapor pressure impurities are present in the refrigerant, the refrigerant may be at a temperature slightly below the saturation temperature for the inlet pressure to compressor (17) of compressor unit (4). When, however, the refrigerant is essentially pure chlorine, it will be at a temperature slightly above the temperature corresponding to the saturation temperature for the inlet pressure to compressor (17) of compressor unit (4). Approximately 10 to 80 weight percent of the chlorine in the second gaseous mixture may be condensed at this stage and approximately 20 to 30 percent of the chlorine is so condensed in this exemplification. The vaporized chlorine refrigerant is fed through line (54) from economizer (34) to the inlet of compressor unit (4). Meanwhile, the condensed chlorine from the second gaseous stream is recovered through line (84) and the balance of the second gaseous mixture stream (63) is fed to economizer (33).

The liquid chlorine refrigerant (43) is vaporized in economizer (33) from 1.56° Centigrade and 7.48 atmospheres to −16.39° Centigrade and 3.810 atmospheres. This results in cooling the second gaseous stream (63) from 30° Centigrade to 7.1° Centigrade and condensing an additional 50 to 80 weight percent of the chlorine in the second gaseous stream. The vaporized chlorine refrigerant is then passed through line (53) from economizer (33) at a pressure of 3.81 atmospheres to the inlet of compressor unit (3).

The liquid chlorine refrigerant (42) to economizer (32) is vaporized from a temperature of −16.39° Centigrade and a pressure of 3.81 atmospheres to a temperature of −33.8° Centigrade and a pressure of 2.04 atmospheres further cooling the second gas mixture (62). The vaporized chlorine refrigerant is passed through line (52) from economizer (32) to the inlet of compressor unit (2).

The liquid chlorine refrigerant (41) to economizer (31) is vaporized from a temperature of −33.8° Centigrade and a pressure of 2.041 atmospheres, further cooling the small amount of remaining second gas mixture (61). The vaporized chlorine refrigerant is passed through line (51) from economizer (31) to the inlet of compressor unit (1).

The ultimate second gaseous mixture (60) recovered from the final economizer stage (31) of the economizer means (30) contains about 72 weight percent noncondensables, thereby providing ultimate recovery of 97 to 99.9 weight percent of the chlorine in the feed gas (71) as liquid chlorine.

The noncondensables (60) may then be treated to yield stack gases or fed to other processes.

A refrigerant purge may be taken from any one or all of the economizers (31, 32, 33, 34) in economizer means (30) as line (40) from economizer (31).

According to an alternative exemplification of this invention, a highly purified chlorine gas product may be provided from a "dirty" chlorine feed, e.g., a chlorine gas feed containing large amounts of low boiling components, such as an oxygen rich chlorine gas feed. In this exemplification, a line may be taken from the liquid space of chlorine tank (26) to the shell side of chlorine condenser (25). The liquid chlorine, withdrawn from the liquid space of the tank (26) is then vaporized as a refrigerant in the shell side of condenser (25). This reduces the coolant load for the condenser (25) while providing a substantially purified chlorine gas product.

According to still another exemplification of this invention, the feed of chlorine refrigerant from the liquid chlorine tank (26) to the individual economizers (31, 32, 33, 34) may be parallel flow. That is, separate lines may carry chlorine refrigerant from the liquid chlorine tank (26) to the individual economizers (31, 32, 33, 34), and the vaporized refrigerant is then passed to the compressor unit inlet in parallel therewith as described hereinabove.

While this inventon has been particularly described with respect to removing noncondensables from chlorine, its use may be extended to other gases having refrigerant properties, such as $SO_2$, $NH_3$, and $CO_2$. For example, the method of this invention may be used to liquefy a high boiling component or components having refrigerating properties, e.g., $SO_2$, $NH_3$, and $CO_2$, out of a gas mixture containing both high boiling components, e.g., $SO_2$, $NH_3$, and $CO_2$, and low boiling components, e.g., $N_2$, $O_2$, and $H_2$. The gas mixture of high and low boiling components is fed to a compressor means, e.g., a centrifugal compressor series, a reciprocating compressor series, or a positive displacement compressor, and compressed therein. The compressed gas is then passed to a condenser where a major portion, e.g., 50 percent or more, even as high as 80 or 90 percent of the high boiling gases, e.g., $SO_2$, $NH_3$, and $CO_2$, are condensed. The liquefied high boiling component is then passed, as a refrigerant, to one stream of an economizer, while a second gas mixture, containing the noncondensables as well as some high boiling component, is passed to another inlet stream of the economizer means. The economizer means contains a plurality of economizers in series, so that the second gas mixture, containing the low components, may be fed in series from one economizer to the next so that the uncondensed fraction of the second gas mixture passes from one economizer to the next economizer in the series, and the condensed fracton of the second gas mixture is recovered off the individual economizer. The refrigerant, e.g., the $SO_2$, $NH_3$, or $CO_2$ process gas, passes through the economizers in series, with a fraction of the refrigerant being vaporized in each economizer, and being returned from the economizer to the inlet of the compressor unit in series therewith.

While the system used in the method of this invention is shown with intermediate product recovery, it is to be understood that compressed gas may be recovered from the outlet of any compressor or economizer for use in another process.

It is to be understood that although the invention has been described with specific reference to particular embodiments thereof, it is not to be so limited since changes and alterations therein may be made which are within the full intended scope of this invention as defined by the appended claims.

We claim:

1. In a method of liquefying chlorine out of a chlorine rich feed gas mixture containing chlorine gas and non-condensable gases, which method comprises:
  A. feeding the gas mixture to compressor means and compressing the gas within the compressor means;
  B. feeding the compressed gas mixture to condenser means and recovering liquid chlorine and a second gas mixture, reduced in chlorine content, from the condenser;
  C. feeding the liquefied chloride from the condenser means to a heat exchanger means as a refrigerant while feeding the second gas mixture to the heat exchanger means in indirect thermal contact with the liquefied chlorine;
  D. recovering liquefied chlorine condensed out of said second gas mixture; and
  E. passing chlorine refrigerant vaporized in the heat exchanger means back to said compressor means; the improvement comprising:
  A. compressing the feed gas mixture in compressor means containing a plurality of individual compressors in series, thereby increasing the feed gas pressure from the first compressor through at least a subsequent compressor to a last compressor in the compressor means;
  B. feeding the liquefied chlorine sequentially through a heat exchanger means containing a plurality of individual heat exchangers in series, from a high pressure end from an outlet of the condenser means through a heat exchanger to a low pressure while feeding the second gas mixture through the heat exchanger means, thereby vaporizing the liquid chlorine refrigerant in the individual heat exchangers at decreasing pressures along the series of individual heat exchangers in the direction of flow, condensing chlorine out of second gas mixture;
  C. recovering the chlorine condensed out of the second gas mixture; and
  D. passing substantially all of the chlorine refrigerant vaporized in a first individual heat exchanger to a first individual compressor having a suction pressure which is, relative to all of the individual heat exchangers of said heat exchanger means, most nearly equal to but lower than the pressure of said individual heat exchanger,; and
  E. repeating steps (C) through (D) for all of said individual heat exchangers in said heat exchanger means while recovering the chlorine condensed out of the second gas mixture in the said heat exchangers.

2. The method of claim 1 wherein the first gas mixture contains more than about 0.8 percent noncondensables and at least about 97 percent of the chlorine in said first gas mixture is recovered as a liquid substantially free of noncondensables.

3. The method of claim 1 wherein the pressure of the refrigerant in an individual heat exchanger exceeds the pressure of the inlet to the individual compressor to which it is fed.

4. The method of claim 1 wherein the temperature difference between the chlorine refrigerant and the second gas mixture is from about 1.0° to about 5.0° Centigrade.

5. The method of claim 1 comprising withdrawing a portion of liquid chlorine from a tank, passing said liquid chlorine to said condenser as a refrigerant, vaporizing said liquid chlorine, and recovering a chlorine gas reduced in noncondensable content.

6. In a method of liquefying a high boiling component out of a gas mixture containing the high boiling component and non-condensable gases, which method comprises:
  A. feeding the gas mixture fo compressor means and compressing the gas within the compressor means;
  B. feeding the compressed gas mixture to condenser means and recovering the liquefied high boiling gas and a second gas mixture, reduced in high boiling component content, from the condenser;
  C. feeding the liquefied high boiling component from the condenser means to a heat exchanger means as a refrigerant, while feeding the second gas mixture to the heat exchanger means in indirect thermal contact with the liquefied high boiling component;
  D. recovering liquefied high boiling component condensed out of said second gas mixture; and
  E. passing high boiling component refrigerant vaporized in the heat exchanger means back to said compressor means; the improvement comprising:
  A. compressing the feed gas mixture in compressor means containing a plurality of individual compressors in series, thereby increasing the feed gas pressure from the first compressor through at least a subsequent compressor to a last compressor in the compressor means;
  B. feeding the liquefied high boiling component through a heat exchanger means containing a plurality of individual heat exchangers in series, from a high pressure end from an outlet of the condenser means through the heat exchanger to a lower pressure while feeding the second gas mixture through the heat exchanger means, thereby vaporizing the liquid high boiling component as a refrigerant in the individual heat exchangers at decreasing pressures along the series of individual heat exchangers in the direction of flow, condensing high boiling component out of the second gas mixture;
  C. recovering the high boiling component condensed out of the second gas mixture;
  D. passing substantially all of the high boiling refrigerant vaporized as a refrigerant in a first individual heat exchanger to a first individual compressor having a suction pressure which is, relative to all of the individual heat exchangers of said heat exchanger means, most nearly equal to but lower than the pressure of said individual heat exchanger;
  E. removing the condensate of the second gas mixture from the individual heat exchangers; and
  F. repeating steps (C) through (E) for all of said individual heat exchangers in said heat exchanger means.

7. The method of claim 6 wherein said high boiling component is selected from the group consisting of $SO_2$, $NH_3$, $CO_2$, and $Cl_2$.

8. In a method of liquefying chlorine out of a chlorine rich feed gas mixture containing chlorine gas and non-condensable gases, which method comprises:
  A. feeding the gas mixture to compressor means and compressing the gas within the compressor means;
  B. feeding the compressed gas mixture to condenser means and recovering liquid chlorine and a second gas mixture, reduced in chlorine content, from the condenser;
  C. feeding the liquefied chloride from the condenser means to a heat exchanger means as a refrigerant, while feeding the second gas mixture to the heat exchanger means in indirect thermal contact with the liquefied chlorine;
D. recovering liquefied chlorine condensed out of said second gas mixture; and
E. passing chlorine refrigerant vaporized in the heat exchanger means back to said compressor means; the improvement comprising:
A. compressing the feed gas mixture in compressor means containing a plurality of individual compressors in series, thereby increasing the feed gas pressure from the first compressor through at least a subsequent compressor to a last compressor in the compressor means;
B. feeding the liquefied chlorine to a heat exchanger means containing a plurality of individual heat exchangers in series, from a high pressure end from an outlet of the condenser means through a heat exchanger to a lower pressure while feeding the second gas mixture through the heat exchanger means, thereby vaporizing the liquid chlorine refrigerant in the individual heat exchangers at decreasing pressures along the series of individual heat exchangers in the direction of flow condensing chlorine out of the second gas mixture;
C. recovering liquefied chlorine condensed out of said second gas mixture;
D. passing substatially all of the chlorine refrigerant vaporized in an individual heat exchanger to a first individual compressor having a suction pressure which is, relative to all of the individual heat exchangers of said heat exchanger means, most nearly equal to but lower than the pressure of said individual heat exchanger;
E. removing the condensate of the second gas mixture from the individual heat exchangers; and
F. repeating steps (C) through (E) for all of said individual heat exchangers in said heat exchanger means.

* * * * *

UNITED STATES PATENT OFFICE
CERTIFICATE OF CORRECTION

PATENT NO. : 3,954,430
DATED : May 4, 1976
INVENTOR(S) : Daniel L. Curtis, John D. Earls, and Joseph E. Fraker, Jr.

It is certified that error appears in the above-identified patent and that said Letters Patent are hereby corrected as shown below:

Column 12, line 5, "fo" should be --to--.

Signed and Sealed this

Twenty-fourth Day of August 1976

[SEAL]

Attest:

RUTH C. MASON
Attesting Officer

C. MARSHALL DANN
Commissioner of Patents and Trademarks